Patented Mar. 23, 1926.

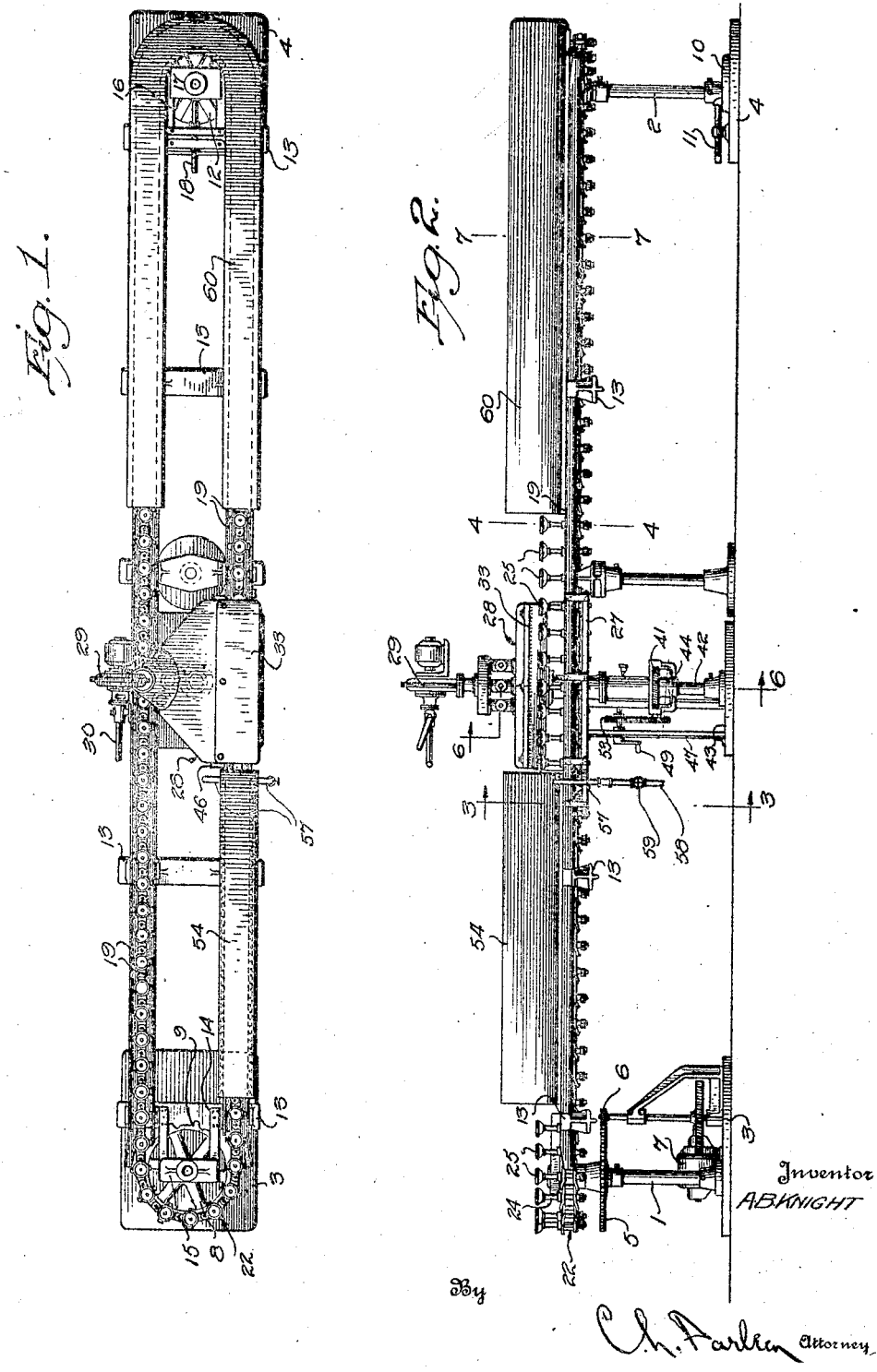

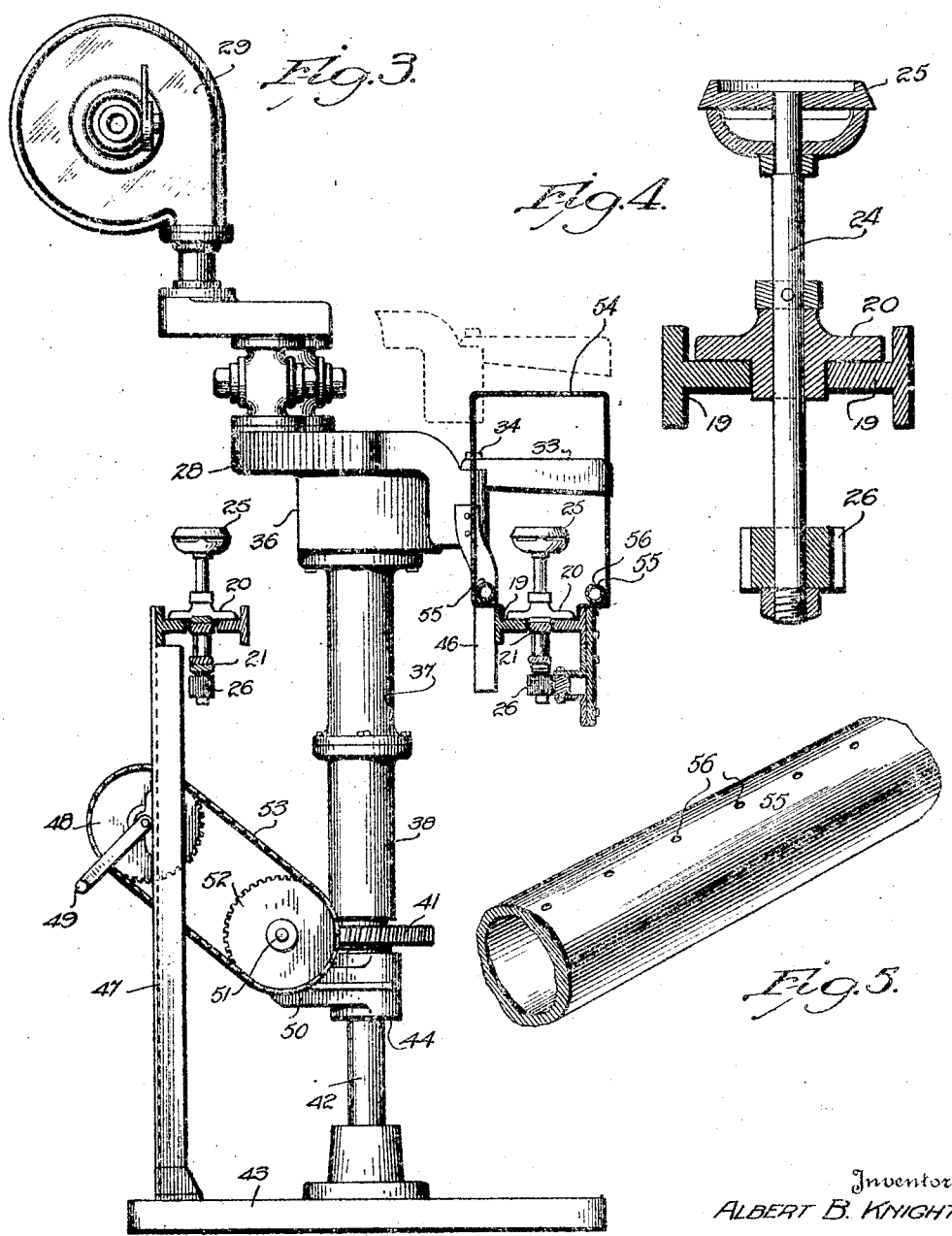

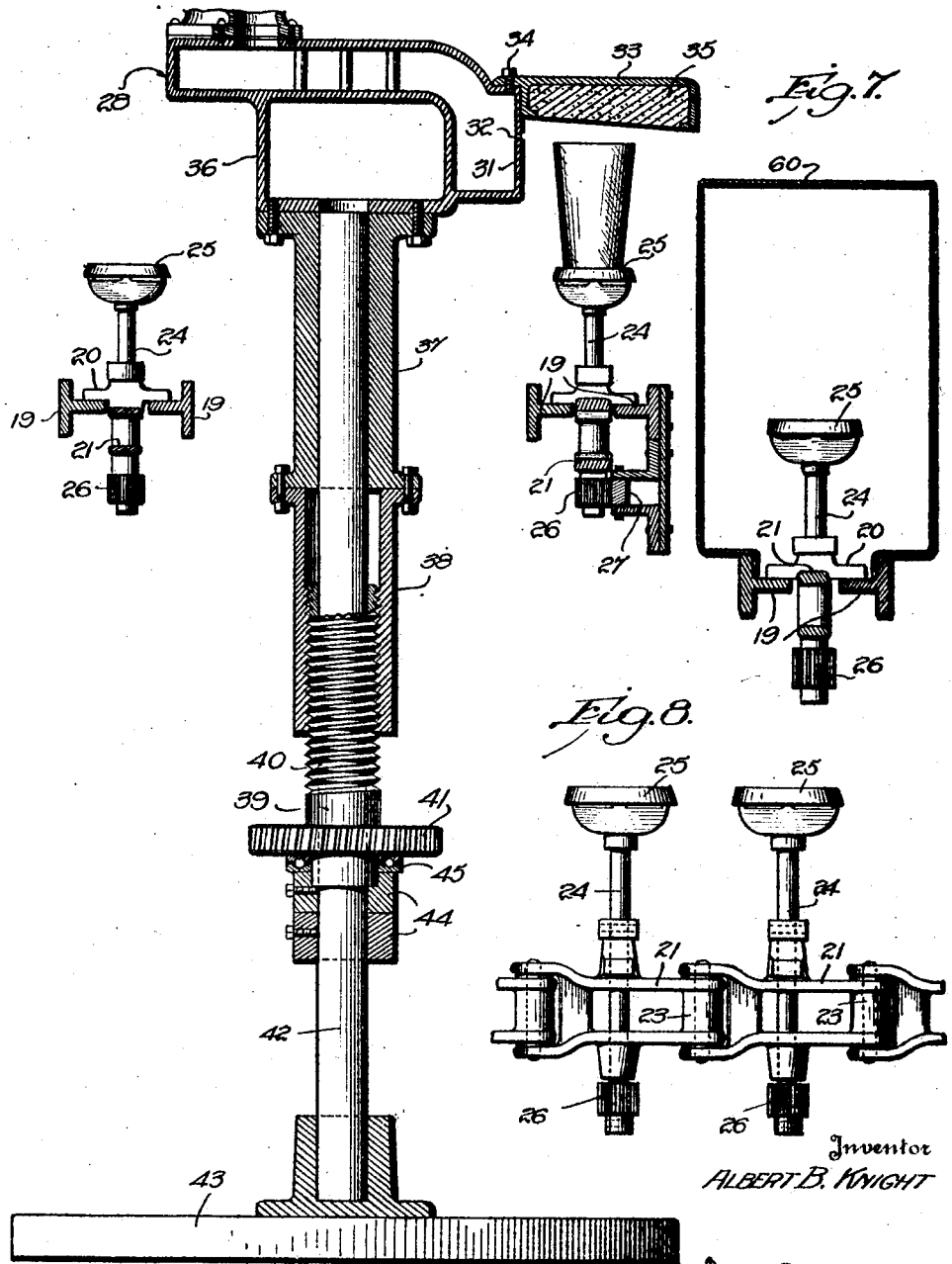

1,577,581

UNITED STATES PATENT OFFICE.

ALBERT BREAKENRIDGE KNIGHT, OF FAIRMONT, WEST VIRGINIA.

APPARATUS FOR GLAZING EDGES OF GLASSWARE.

Application filed December 13, 1923. Serial No. 680,518.

*To all whom it may concern:*

Be it known that I, ALBERT BREAKENRIDGE KNIGHT, a citizen of the United States, residing at Fairmont, in the county of Marion and State of West Virginia, have invented certain new and useful Improvements in Apparatus for Glazing Edges of Glassware, of which the following is a specification.

This invention relates to a method of and apparatus for glazing the edges of glassware and more particularly to a method and apparatus whereby the edges of pressed or blown ware may be glazed without danger of breakage.

The cost of labor and materials have increased materially and manufacturers are practicing rigid economy in the manufacture of glass. In most instances economy in manufacture is effected by materially decreasing the expensive lead content of the glass batches and very often the percentage of lead employed is negligible. The decrease in the percentage of lead in the batch results in ware which is incapable of withstanding sudden heat changes without breaking and this is particularly true of glass batches containing little if any lead.

It has been found that glazing machines which heretofore have been thoroughly satisfactory in use when glazing the edges of glassware containing a high perecntage of lead are now causing material losses to manufacturers due to the fact that they change the temperature of the glassware so suddenly as to cause considerable breakage.

An important object of the present invention is to provide a method of and apparatus particularly adapted for glazing glassware containing a low percentage of lead and the method consists generally in preheating the glass to a fairly warm temperature but materially below its fusing point whereby the introduction of ware to the heat of the glazing burner does not constitute such a sudden change in temperature as to cause breakage of the ware.

A further object of the invention is the provision of a machine of large capacity in the use of which the glassware may be rapidly fed to the burner at one end of the machine and removed after glazing at the rear of the machine.

A further object of the invention is the provision of a hood for preheating the glassware before it passes to the glazing burner and the provision of means for retaining the heat to permit the glassware to gradually cool after leaving the burner, whereby it is properly annealed.

Other objects and advantages of the invention will be apparent during the course of the following description.

In the drawings I have shown one embodiment of the invention. In this showing—

Figure 1 is a plan view of the machine,

Figure 2 is a side elevation thereof,

Figure 3 is a section taken on line 3—3 of Figure 2,

Figure 4 is a detailed sectional view taken on line 4—4 of Figure 2,

Figure 5 is a fragmentary perspective of one of the preheating burners,

Figure 6 is a section taken on line 6—6 of Figure 2,

Figure 7 is a section taken on line 7—7 of Figure 2, and,

Figure 8 is a detailed side elevation of a portion of the conveyor chain and associated elements.

In the practice of the present method I provide a glazing burner adapted to project a thin sheet of flame across the upper edges of the ware to be glazed. Means are provided for moving the glassware toward the burner and a warming hood is arranged over the conveying means adjacent the glazing burner whereby the chill of the glassware is taken out and the ware gradually increased in temperature to the point where it is moved by the conveying means into the heat area created by the glazing burner.

The hood is adapted to preheat the glass to a fairly warm temperature but not to a temperature closely approximating the fusing point. The conveying means is adapted to move the glassware a substantial distance past the glazing burner and I provide a hood covering the conveying means and adapted to act as a leer to slowly cool the glassware by retaining the heat in the ware after it has passed the burner. The heat retaining hood is of such length that the glasses are adapted to be cooled by a very gradual loss in heat to anneal them, and after leaving the hood they are sufficiently cool to be handled by the operator. Thus it will be seen that my method comprises gradually raising the temperature of the glasses to a point below the fusing point, glazing the ware, and gradually lowering the temperature of the ware after it has passed the burner. While I prefer to employ the heat retaining hood I have found that satisfactory results may be obtained without its use particularly if the apparatus is employed in a fairly warm room.

Referring to the drawings showing the apparatus the numerals 1 and 2 designate a pair of vertical standards or shafts mounted at opposite ends of the machine and adapted to be supported upon the floor by bases 3 and 4 respectively. The standard 1 is adapted to rotatably support a gear 5 meshing with a pinion 6 suitably driven from an electric motor 7 or other suitable source of power. A sprocket 8 is secured to the gear 5 and is provided with suitable engaging teeth 9 as shown in Figure 1.

The standard 2 is slidably mounted at its lower end in guides 10 and an adjusting screw 11 connected with the base is adapted to move the lower end of the standard 2 outwardly longitudinally of the machine. A sprocket 12 is rotatably supported on the standard 2 and this sprocket is similar in construction to the sprocket 8 previously described.

A plurality of transverse supporting members 13 are arranged across the machine as shown in Figures 1 and 2. One of the supporting members is arranged adjacent the standard 1 and is rigidly connected to arm 14 of a yoke 15 which is rigidly connected at the upper end of the standard 1. Another of the supporting members 13 is arranged adjacent the standard 2 and is rigidly connected with arms 16 slidably connected with a cross head 17 rigidly connected to the upper end of the standard 2. An adjusting screw 18 engages the cross head 17 to move the upper end of the standard 2 outwardly longitudinally in the same manner as the lower end of the standard is adapted to be moved by the screw 11.

A pair of rails 19 is mounted at each side of the machine and are adapted to be supported by the members 13. As shown in Figure 4 each of the rails 19 is substantially T-shaped and is adapted to support cross arms 20 carried by links 21 of a conveyor 22. It will be apparent that the conveyor is adapted to slide along the rails by virtue of the contact between the cross arms 20 and the horizontal portions of the rails 19. Each of the links 21 is provided with a cylindrical portion 23 adjacent one end adapted to be engaged by the teeth 9 of the sprocket 8 whereby the conveyor is moved. Each of the links 21 is adapted to rotatably support a spindle 24 which extends above and below the link as shown in Figure 8. The upper ends of the spindles are provided with supporting members or cups 25 in which the articles of glassware to be glazed are placed. The lower ends of the spindles are provided with pinions 26 adapted to engage the teeth of a rack-bar 27 as shown in Figures 2, 3 and 6. The rack-bar extends only along the central portion of the machine so that it will be obvious that the spindles 24 are revolved only through a short portion of their travel.

A burner 28 is arranged substantially centrally of the machine as shown in Figures 1 and 2. The burner employed is preferably of the type shown in my copending application filed December 17, 1923, Serial No. 681,232. The burner is substantially fan-shaped as shown in Figure 1 and is adapted to be supplied with gas under pressure by a blower 29 connected to a suitable source of glass supply through a pipe 30. The burner is provided with an outer wall 31 arranged substantially parallel to and above the rails 19. This wall is provided with a series of openings 32 forming burner nozzles as will be obvious. A shield 33 is connected to the outer portion of the burner 28 by bolts or the like 34. As shown in Figure 6 the shield is adapted to overhang the glasses as they pass the burner nozzles and is filled with any suitable refractory material 35 such as fire clay or the like and the lower surface of the refractory material slopes outwardly and downwardly at a slight angle whereby the flames from the burner may be confined closely to the edges of the passing glassware.

The burner 28 is provided with a central depending base 36 bolted or otherwise secured to a depending tubular member 37. The tubular member 37 is connected at its lower end with a second depending member 38 which is internally threaded as shown in Figure 6. A rotatable sleeve 39 is arranged vertically as shown in Figure 6 and has a portion threaded as at 40 for engagement with the threads of the member 38. The sleeve 39 is provided adjacent its lower end with a gear 41 as shown in Figures 3 and 6. A stationary shaft 42 is arranged within the sleeve 39 to form a bearing therefor and this shaft is supported upon the floor by a base 43. The upper end of the shaft 42 is journaled in the member 37 as shown in Figure 6. A pair of thrust collars 44 are secured to the shaft 42 below the gear 41 and a thrust bearing 45 is arranged between the gear 41 and the upper collar 44. The burner 28 is provided at opposite ends with depending arms 46 adapted to engage the inner portions of the adjacent rails 19 to prevent rotation of the burner and associated elements when the gear 41 is rotated.

A supporting member 47 is arranged on the base 43 and is connected at it upper end with one of the rails 19 as shown in Figure 3. A sprocket 48 is rotatably carried by the supporting member 47 and is adapted to be rotated by a crank 49. A bearing bracket 50 is carried by one of the collars 44 and is adapted to rotatably support a shaft 51 to which is rigidly secured a sprocket 52. A chain 53 passes about the sprockets 48 and 52 as shown. A worm (not shown) is carried by the shaft 51 and adapted to engage the gear 41.

A hood 54 is arranged to one side of the burner 28 as shown in Figures 1 and 2. Referring to Figure 3 it will be seen that this hood is substantially U-shaped and adapted to bridge across the rails 19 which are arranged forwardly to the burner. The lower ends of the hood are turned inwardly and secured to the rails as shown in Figure 3. The hood extends from a point adjacent the sprocket 8 to a point close to the inlet side of the burner 28. The lower opposite sides of the hood are provided with burner tubes 55 having apertures 56 therein for a purpose to be described. As shown in Figure 1 the pipes 55 extend substantially throughout the length of the hood 54 and are connected at one end to branch pipes 57 fed from a suitable source of gas supply through a pipe 58 and the flow of gas is controlled through a suitable valve 59. The apertures 56 are provided preferably throughout the lengths of the pipes 55 and are adapted to serve as burner nozzles to heat the interior of the hood 54. It will be obvious that the hood is of such size and shape as to permit glassware of varying widths and heights to pass therethrough.

A second hood 60 is arranged at the opposite end of the machine. The hood 60 is similar in construction to the hood 54 as shown in Figure 7, having its lower ends secured to the rails 19. The inlet end of the hood 60 is arranged at a point spaced from the outlet side of the burner 28 and extends to the opposite end of the machine, around the sprocket 12 and back through a substantial portion of the rails 19 at the opposite side of the machine as shown in Figure 1. The hood 60 preferably is not provided with heating means but is adapted to retain the heat of the glasses after they pass the burner 28, whereby they are gradually cooled and annealed.

The operation of the apparatus is as follows:

The motor 7 is started and through its gearing causes the sprocket 8 to rotate in a counterclockwise direction as seen in Figure 1. The teeth 9 of the sprocket engage the cylindrical portions 23 of the conveyor links causing the forward run of the conveyor to travel from left to right as seen in Figures 1 and 2. The operator stands near the left hand end of the machine and places the articles of glassware in the holders 25 as shown in Figure 6. Assuming the preheater 54 and burner 28 to be in operation it will be seen that the glassware enters the left end of the preheater 54 and is subjected to the heat therein generated by the burner nozzles 56. The burner nozzles 56 are adapted to burn only a small quantity of gas and are not intended to raise the temperature within the hood to a high point. The glassware is gradually heated as it travels through the hood 54, the chill first being taken out of the glasses and then gradually raised to a fairly high point when it leaves the hood, but not to a point approximating the fusing point of the glass.

As shown in Figures 1 and 2 the outlet end of the hood 54 is arranged immediately adjacent the inlet side of the burner 28. As the glassware is moved from the hood 54 it is immediately subjected to the flames from the nozzles 32 of the burner 28. Just before the glassware leaves the hood 54 the pinions 26 of the conveyor spindles 24 come into engagement with the rack 27 whereby the spindles are caused to rotate as they pass the glazing burner. It is seen that the rack 27 extends throughout the width of the burner 28 so that the glassware is continuously rotated while subjected to the action of the flame from the nozzles 32. The burner 28 is adapted to fuse the glass at the upper edge of each of the articles whereby it runs slightly to form a glazed and smooth upper edge.

As shown in Figures 1 and 2 the inlet end of the hood 60 is arranged at a point spaced somewhat from the outlet side of the burner 28. It will be obvious that the glassware passing the nozzles of the burner 28 are largely hidden from view by the shield 33. The space between the hood 60 and the burner 28 is provided in order that the operator may inspect the ware as it passes from the glazing burner to the heat retaining hood 60. This space, however, is not sufficient in length to permit the glassware to lose any substantial amount of its heat. As the ware passes into the hood 60 the heat gradually radiates from the ware and is confined by the hood 60. The ware passes throughout the length of the forward run of the conveyor, turns about the sprocket 12 and continues along the rear run of the conveyor until it passes from the hood 60. The length of time required to pass completely through the hood has been found sufficient to permit the heat of the ware to be gradually radiated to slowly lower the temperature of the ware to anneal it. In other words, the hood 60 acts as a leer, and the temperature at the outlet end is sufficiently low to permit the ware to be handled by hand.

While I have shown the apparatus in connection with a glazing burner it will be obvious that it also may be employed in connection with a polishing burner for polishing the sides of the glassware.

I have found that the preheating of the glasses as described enables the ware to withstand the heat of the glazing or polishing burner and that the heat retaining means prevents the rapid radiation of heat from the glassware so that breakage is prevented.

It is to be understood that the form of my invention herewith shown and described to be taken as a preferred example of the same and that various changes in the shape, size, and arrangement of parts may be resorted to without departing from the spirit of the invention or the scope of the subjoined claims.

Having thus described my invention, I claim:

1. A device of the character described comprising a preheating hood, means for heating said hood, a heat retaining hood in alinement therewith and spaced therefrom, a conveyor adapted to move articles of glassware through said hoods, and a burner mounted between said hoods.

2. A device of the character described comprising a substantially inverted U-shaped preheating hood of substantial length, means for heating said hood throughout its length, a burner arranged adjacent said hood, a heat retaining hood of substantial length arranged on the opposite side of and spaced from said burner, said hoods being arranged in alinement with each other, and means for conveying glassware through said preheating hood, past said burner, and through said heat retaining hood.

In testimony whereof I affix my signature.

ALBERT BREAKENRIDGE KNIGHT.